(12) United States Patent
Bloom et al.

(10) Patent No.: US 8,891,876 B2
(45) Date of Patent: Nov. 18, 2014

(54) MOUTH CORNER CANDIDATES

(75) Inventors: Daniel Bloom, Loveland, CO (US); Dan L. Dalton, Greeley, CO (US); David Staudacher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 13/093,523

(22) Filed: Apr. 25, 2011

(65) Prior Publication Data

US 2012/0269428 A1   Oct. 25, 2012

(51) Int. Cl.
*G06K 9/66* (2006.01)
*G06K 9/00* (2006.01)

(52) U.S. Cl.
CPC .................................. *G06K 9/00248* (2013.01)
USPC ........... 382/195; 382/100; 382/118; 382/164; 382/181; 382/190

(58) Field of Classification Search
USPC .......... 382/100, 115, 118, 164, 181, 190, 195
See application file for complete search history.

(56) References Cited

U.S. PATENT DOCUMENTS

| | | | | |
|---|---|---|---|---|
| 5,680,481 | A * | 10/1997 | Prasad et al. ................... | 382/190 |
| 5,982,912 | A * | 11/1999 | Fukui et al. .................... | 382/118 |
| 6,389,155 | B2 * | 5/2002 | Funayama et al. ............. | 382/118 |
| 6,633,655 | B1 * | 10/2003 | Hong et al. .................... | 382/118 |
| 7,218,760 | B2 | 5/2007 | Gu et al. | |
| 7,620,217 | B2 | 11/2009 | Chen et al. | |
| 7,627,149 | B2 * | 12/2009 | Perlin et al. ................... | 382/118 |
| 7,764,828 | B2 * | 7/2010 | Sasaki et al. .................. | 382/154 |
| 7,835,568 | B2 * | 11/2010 | Park et al. ..................... | 382/154 |
| 8,265,348 | B2 * | 9/2012 | Steinberg et al. ............. | 382/117 |
| 2007/0071289 | A1 * | 3/2007 | Takeguchi et al. ............ | 382/118 |
| 2007/0201729 | A1 * | 8/2007 | Yuasa et al. ................... | 382/118 |

FOREIGN PATENT DOCUMENTS

CN           101216882 A       7/2008

OTHER PUBLICATIONS

Chris Harris and Mike Stephens, "A Combined Corner and Edge Detector" Proceedings of 4th Alvey Vision Conference, pp. 147-152, 1988.*

* cited by examiner

*Primary Examiner* — Eric Rush
(74) *Attorney, Agent, or Firm* — Chun-Liang Kuo (57) ABSTRACT

A device to apply detection schemes to texture information of a face detected within an image to generate mouth corner candidates and identify best matching mouth corners by applying a geometric model to the moth corner candidates.

19 Claims, 7 Drawing Sheets

MOUTH CORNER CANDIDATES

BACKGROUND

Using a location of a person's mouth within an image, a device can detect whether a person within the image is smiling or frowning. Additionally, the device can determine whether the person's mouth is open or closed. In another example, the device can collect details of the mouth and/or perform manipulations to the mouth of the person based on the detected location of the person's mouth.

When detecting a location of the mouth of the person within an image, the device can initially detect a location of the person's face within the image. The device can then use a predefined shape of the mouth and detect whether any objects within the image match the predefined shape of the mouth. This may sometimes yield unfavorable results due to a wide variety of mouth shapes and sizes influenced by an ethnicity, age, gender, and/or other factors of a person.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By accessing texture information of a face within an image, one or more detection schemes can be applied to the texture information and a device can identify mouth corner candidates for the face within the image. Using the mouth corner candidates, the device can apply a geometric model to each of the mouth corner candidates and identify the best matching mouth corners for the face. By generating multiple mouth corner candidates with the detection schemes and applying a geometric model to each of the mouth corner candidates, a likelihood of identifying a true or best matching mouth corner from the mouth corner candidates can be increased.

Once the best matching mouth corners have been identified, the best matching mouth corners and their corresponding coordinates can be stored on the device. As a result, the device can use the best matching mouth corners as an anchor point for the mouth or face. Additionally, the device can detect information of the mouth or the face and/or manipulate the mouth or the face using the location of the best matching mouth corners.

Figure 1:
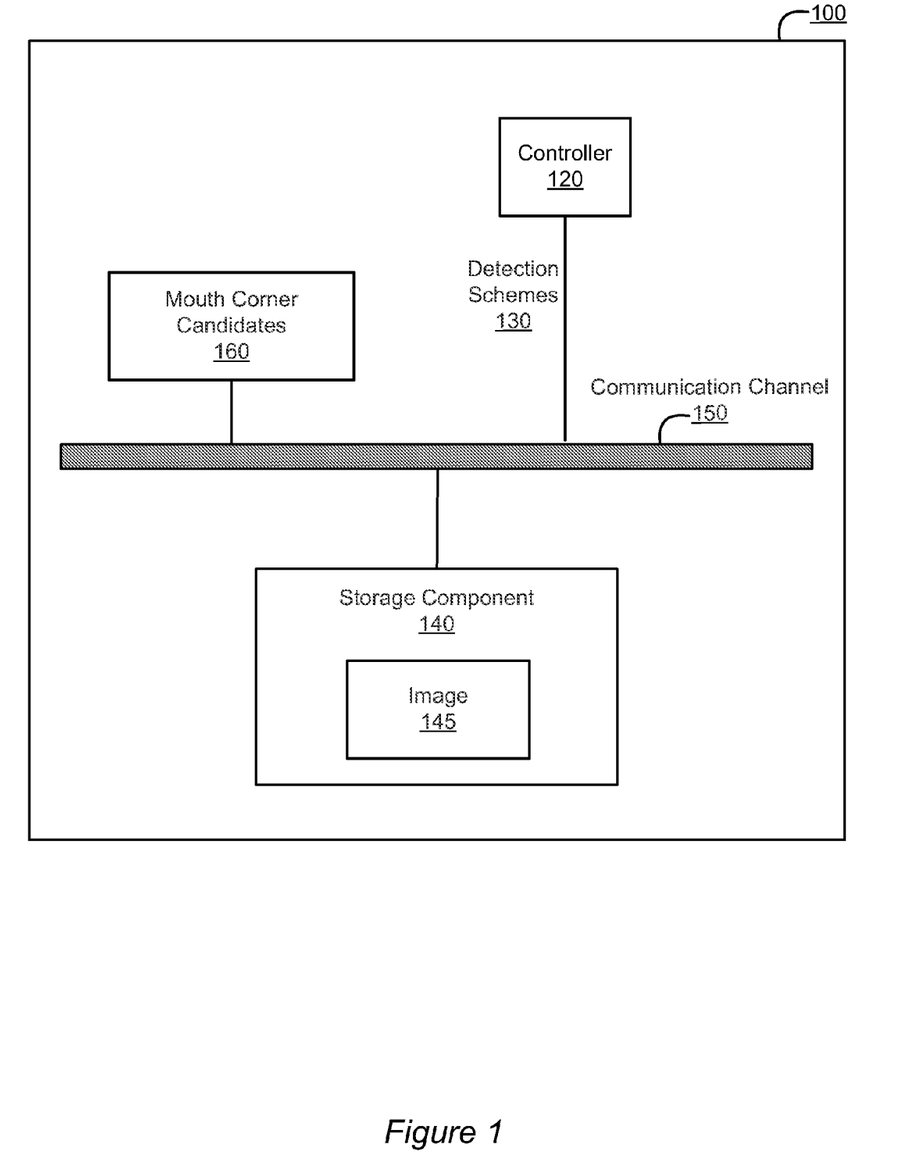
FIG. 1 illustrates a device according to an embodiment.

FIG. 1 illustrates a device 100 according to an embodiment. The device 100 is a digital camera, a cellular device, a PDA (personal digital assistant), and/or an E (electronic) Book/Reader. In another embodiment, the device 100 can be a laptop, a netbook, a tablet, an all-in-one system, a desktop, a server, and/or any additional device which can access an image 145 from a storage component 140.

As shown in FIG. 1, the device 100 includes a controller 120, a storage component 140, and a communication channel 150 for the device 100 and/or one or more components of the device 100 to communicate with one another. The storage component 140 can be computer readable memory coupled to the device 100 and include one or more images 145. In another embodiment, the storage component 140 can additionally include a coordinate application. In other embodiments, the device 100 includes additional components and/or is coupled to additional components in addition to and/or in lieu of those noted above and illustrated in FIG. 1.

As noted above, the device 100 includes a controller 120. The controller 120 sends data and/or instructions to the components of the device 100, such as the storage component 140 and/or the coordinate application. Additionally, the controller 120 receives data and/or instruction from components of the device 100, such as the storage component 140 and/or the coordinate application. The coordinate application is an application which can be used independently and/or in conjunction with the controller 120 to detect mouth corners within an image 145.

For the purposes of this application, mouth corners correspond to a location or coordinate of a left mouth corner and location or coordinate of a right mouth corner of a person within an image 145. When detecting mouth corners, the controller 120 and/or the coordinate application can initially access an image 145 accessible to the device 100. One or more images 145 can be digital images which are stored on the storage component 140. In another embodiment, one or more of the images 145 can be stored on another device and accessible to the controller 120 and/or the coordinate application through a network interface component and/or a remote connection.

In response to accessing an image 145, the controller 120 and/or the coordinate application can determine whether a face of a person is included within the image 145. In one embodiment, the controller 120 and/or the coordinate application can use facial detection and/or eye detection technology to determine whether a person's face is included within the image 145. If a face is detected, the controller 120 and/or the coordinate application can proceed to access texture information of the face.

For the purposes of this application, texture information of the face includes image data of the person's face or head. The image data can include information of the pixels which make up the person's face within the image 145. In one embodiment, the image data can list a color for each pixel and/or a coordinate for each pixel included in the person's face.

The controller 120 and/or the coordinate application can apply one or more detection schemes 130 to the texture information to detect one or more mouth corner candidates. A detection scheme 130 can be a method, process, and/or algorithm configured to analyze the texture information of the face to detect a left mouth corner coordinate and a right mouth corner coordinate of the face. The left mouth corner coordinate and the corresponding right mouth corner coordinate are identified by the controller 120 and/or the coordinate application to be a mouth corner candidate 160.

In one embodiment, both the left mouth corner candidate and the corresponding right mouth corner candidate can be identified using the same detection scheme 130. In another embodiment, the left mouth corner candidate can be identified with a first detection scheme 130, while the corresponding right mouth corner candidate is detected with a different detection scheme 130.

The controller 120 and/or the coordinate application can identify a corresponding mouth corner candidate 160 for each of the detection schemes 130 applied to the texture information. In response to identifying the mouth corner candidates 160, the controller 120 and/or the coordinate application can proceed to apply a geometric model to each of the mouth corner candidates 160 to identify the best matching mouth corners of the face. A geometric model is a method or algorithm which uses the coordinates from the mouth corner candidates to detect a shape, such as a mouth, within the image 145.

For the purposes of this application, the best matching mouth corners include a left mouth corner coordinate and a right mouth corner coordinate identified to be the most likely coordinates of the mouth corners of the face. In one the controller 120 and/or the coordinate application assign a score to each mouth corner candidate 160 in response to applying the geometric model the corresponding mouth corner candidate 160. The mouth corner candidates 160 with the highest score are identified by the controller 120 and/or the coordinate application to be the best matching mouth corners.

The controller 120 and/or the coordinate application can store the best matching mouth corners to the storage component 140. In one embodiment, the best matching mouth corners are stored as metadata with the image 145. By storing the best matching mouth corners, the coordinates of the best matching mouth corners can be used as anchor points for the mouth and face of the person with the image 145. The anchor points identify the corners of the mouth and can be used to detect information of the mouth and/or manipulate the mouth.

The coordinate application can be firmware which is embedded onto the device 100 and/or the storage component 140. In another embodiment, the coordinate application is a software application stored on the device 100 within ROM (read only memory). In other embodiments, the coordinate application can be stored and accessible to the device 100 or the storage component 140 from a different location. Additionally, in one embodiment, the storage component 140 is included in the device 100. In other embodiments, the storage component 140 is not included in the device 100, but is accessible to the device 100 utilizing a network interface coupled to the device 100. The network interface can be a wired or wireless network interface card.

In a further embodiment, the coordinate application is stored and/or accessed through a server coupled through a local area network or a wide area network. The coordinate application communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

Figure 2:
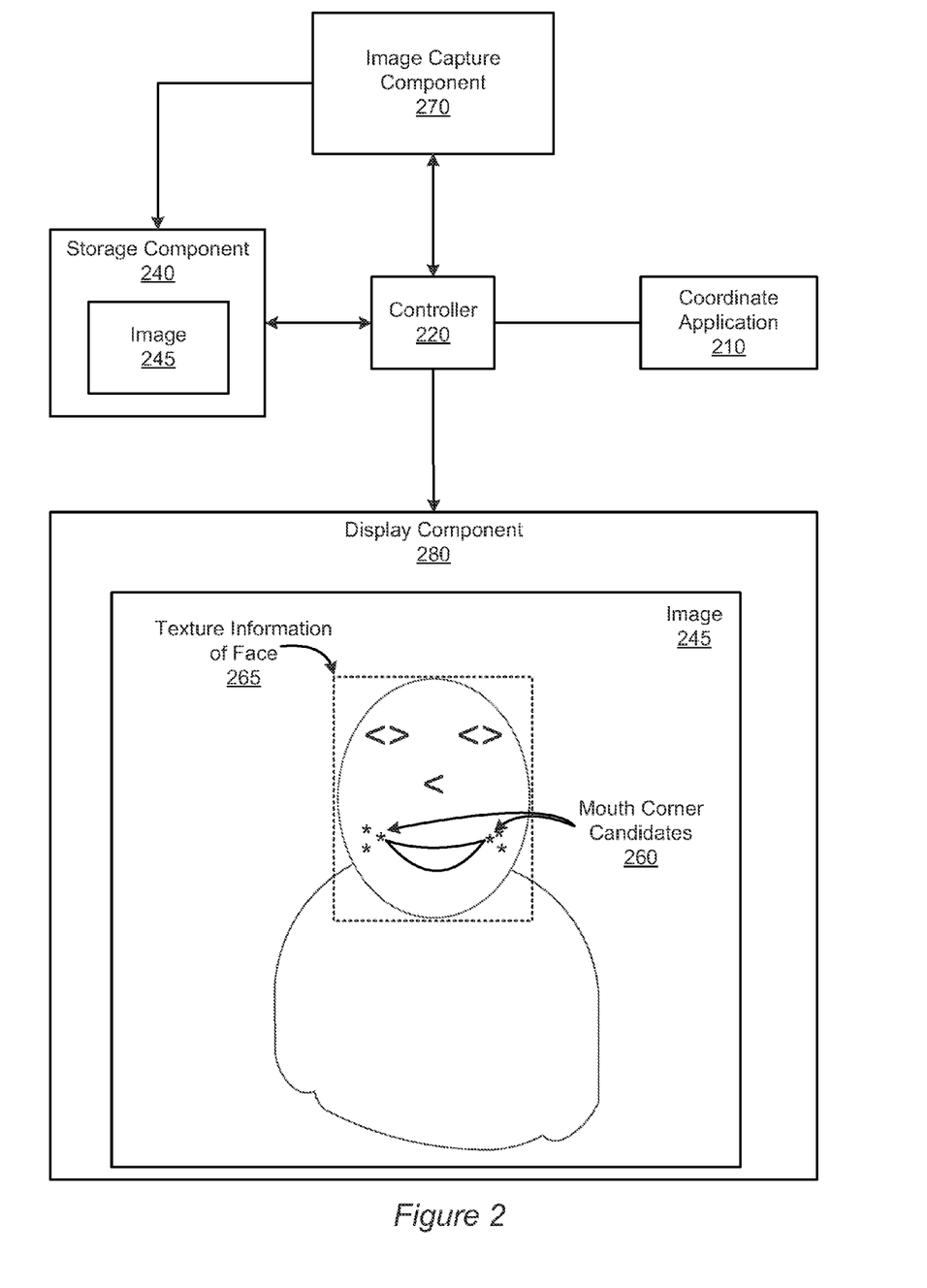
FIG. 2 illustrates a coordinate application accessing texture information of an image according to an embodiment.

FIG. 2 illustrates a coordinate application 210 accessing texture information 265 of an image 260 according to an embodiment. As noted above, an image 245 is a digital image of a scene, one or more objects, and/or one or more people. As shown in the present embodiment, a storage component 240 of the device can store one or more of the images 245. The storage component 240 can be a storage device and/or any additional computer readable memory which can include one or more images 245. In one embodiment, the storage component 240 includes non-volatile memory, such as flash memory, optical memory, magnetic memory, and/or any physical non-transitory memory. In another embodiment, the storage component 240 can include volatile memory.

Additionally, as illustrated in FIG. 2, the controller 220 and/or the coordinate application 210 can be coupled to an image capture component 270 of the device. In one embodiment, one or more of the images 245 can be captured with the image capture component 270 of the device. The image capture component 270 can be a camera and/or any additional component which can capture and/or record one or more images 245 to be stored on the storage component 240. In other embodiments, one or more images 245 can be stored and accessed by the controller 220 and/or the coordinate application 210 from another device accessible to the device.

One or more of the images 245 can further be displayed on a display component 280 of the device. The display component 280 can be a hardware component coupled to the device and configured to display one or more of the images 245. In one embodiment, a display component 280 is a LCD (liquid crystal display), a LED (light emitting diode) display, a CRT (cathode ray tube) display, a plasma display, a projector, a touch wall and/or any additional device configured to display one or more images 245.

As noted above, the controller 220 and/or the coordinate application 210 can access an image 245 and determine whether the image 245 includes a face. In one embodiment, the controller 220 and/or the coordinate application 210 can use face and/or eye detection technology to determine whether the image 245 includes a face. If the image 245 includes a face, the controller 220 and/or the coordinate application 210 can detect a location of the face and access information corresponding to the face. In one embodiment, the face and/or eye detection technology can be used by the controller 220 and/or the coordinate application to locate the face.

As shown in FIG. 2, the information of the image 245 can be texture information 265 of the face detected within the image 245. The texture information 265 can include image data, which identify corresponding pixels which make up the face, a location of the corresponding pixels, and/or a color of the corresponding pixels. In other embodiments, the texture information 265 can include additional information of the image 245. Additionally, the texture information 265 can be stored as metadata of a corresponding image 245 or the information can be a stored as an additional file associated with the corresponding image 245.

In response to accessing texture information of the face, the controller 220 and/or the coordinate application 210 can apply one or more detection schemes to the texture information of the face to detect and identify a location of one or more mouth corner candidates 260. For the purposes of this application, a mouth corner candidate 260 is a coordinate of one or more pixels which can correspond to a location of a left corner of a mouth or a right corner of a mouth of the face. In one embodiment, an image 245 can be represented as a pixel map and each coordinate of the mouth corner candidates 260 can include an x-axis coordinate and/or a y-axis coordinate corresponding to a location of a mouth corner on the pixel map. Additionally, as shown in the present embodiment, one or more of the mouth corner candidates 260 can be displayed on the display component 280.

Figure 3:
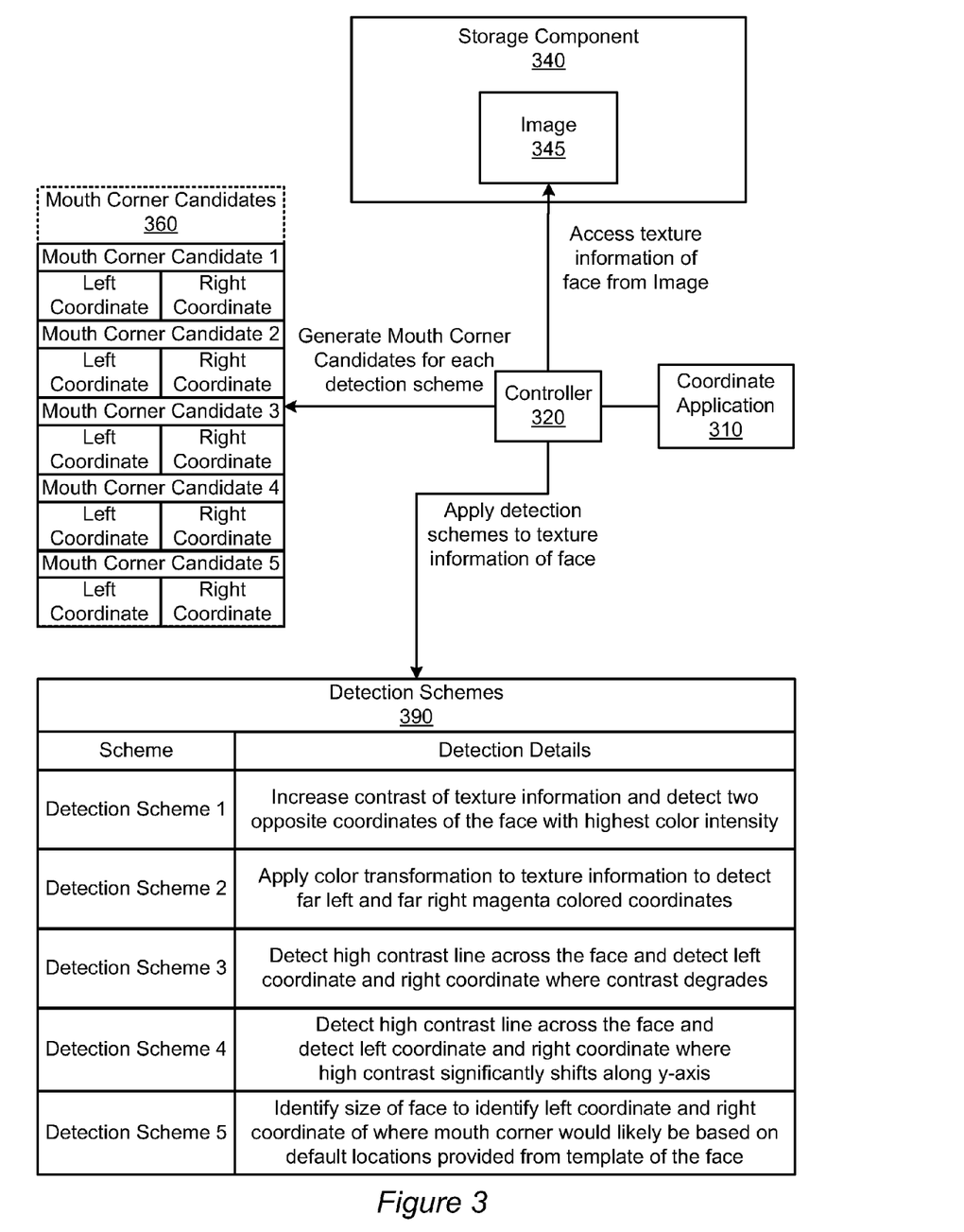
FIG. 3 illustrates a block diagram of a coordinate application generating mouth corner candidates according to an embodiment.

FIG. 3 illustrates a block diagram of a coordinate application 310 generating mouth corner candidates 360 according to an embodiment. The controller 320 and/or the coordinate application 310 initially access an image 345 and proceed to apply one or more detection schemes 390 to texture information of a face detected within the image 345. Applying a detection scheme 390 to the texture information can include the controller 320 and/or the coordinate application 310 applying to the detection scheme 390 to pixels which make up the face within the image 345.

As noted above, a detection scheme 390 includes a process, a method, and/or algorithm applied by the controller 320 and/or the coordinate application 310 to the texture information of the face to identify a mouth corner candidate 360. One or more of the detection schemes 390 can be stored or accessed as a file, list, and/or database on the storage component 340 or on any other component accessible to the controller 320 and/or the coordinate application 310.

In one embodiment, when applying a detection scheme 390 to the texture information of the face, the controller 320 and/or the coordinate application 310 can modify an image property of the face. For example, modifying the image property includes modifying a color, contrast, saturation, brightness, and/or sharpness of the pixels included in the face. In another embodiment, when applying a detection scheme 390, the controller 320 and/or the coordinate application 310 can detect for one or more pixels which match a predefined criteria. In other embodiments, when applying a detection scheme 390, the controller 320 and/or the coordinate application 310 can detect a pattern of the pixels included in the face.

In response to applying a detection scheme 390 to the texture information, the controller 320 and/or the coordinate application 310 can identify a mouth corner candidate 360. The controller 320 and/or the coordinate application 310 can identify a mouth corner candidate 360 for each corresponding detection scheme 390 applied to the texture information of the face. As illustrated in FIG. 3, each mouth corner candidate 360 includes a left coordinate, corresponding to a location of the left corner of the mouth, and a right coordinate, corresponding to a location of the right corner of the mouth.

In one embodiment, the controller 320 and/or the coordinate application 310 can initially apply Detection Scheme 1 to the texture information. When applying Detection Scheme 1, the controller 320 and/or the coordinate application 310 increase a contrast of the pixels of the face and detect two opposite coordinates of pixels with the highest color intensity. A color intensity of a coordinate corresponds to how far left or how far right the color of the pixels is positioned on a color scale. The farther left or farther right the color is positioned, the higher the color intensity. Additionally, the two coordinates can be opposite from one another if they are located on opposite sides of a vertical y-axis.

By increasing the contrast of the pixels, the pixels which make up the mouth should appear more intense than other pixels on the face. Using the location of the high color intensity pixels, the controller 320 and/or the coordinate application 310 can identify a location or area of the mouth on the face. The controller 320 and/or the coordinate application 310 can additionally identify the coordinate of one or more far left pixels of the mouth with the highest color intensity as a left coordinate of Mouth Candidate 1. Additionally, a coordinate of one or more far right pixels of the mouth with the highest color intensity can be identified as the right coordinate of Mouth Candidate 1.

Additionally, when applying Detection Scheme 2, the controller 320 and/or the coordinate application 310 apply a color transformation to the pixels included in the face and detect a location of a far left pixel and far right pixel with the color magenta. A color transformation changes a color of a pixel from one color space to another. Applying a color transformation to the pixels included in the face causes the pixels of the mouth to turn a magenta color, while the other pixels of the face remain the same color or change to another color.

In one embodiment, the controller 320 and/or the coordinate application 310 can further determine whether a shape of the magenta colored pixel matches a shape of the mouth. By detecting the location of the far left magenta colored pixel and the location of the far right magenta colored pixel, the left corner and right corner of the mouth can be detected and the controller 320 and/or the coordinate application 310 identify the left corner and the right corner as the left and right coordinate for Mouth Corner Candidate 2.

Furthermore, when applying Detection Scheme 3, the controller 320 and/or the coordinate application 310 detect a high contrast line which travels horizontally across the x-axis of the face. The high contrast line can be straight or curved continuous line which represents a gap or seam between the lips of the mouth. The controller 320 and/or the coordinate application 310 detect left and right coordinates where a contrast of the line begins to degrade below a predefined contrast or color intensity. The predefined contrast can be defined by the controller 320 and/or the coordinate application 310. The controller 320 and/or the coordinate application 310 identify the left pixel of the line before degradation is detected as the left coordinate and the right pixel of the line before degradation is detected as the right coordinate for Mouth Corner Candidate 3.

In another embodiment, as shown with Detection Scheme 4, instead of detecting for the contrast degrading on the high contrast line to detect the mouth corner candidates, the controller 320 and/or the coordinate application 310 can detect for vertical shifts of the high contrast line which exceed a predefined distance along the y-axis. If a vertical shift along the y-axis is detected to be greater than the predefined distance, the controller 320 and/or the coordinate application 310 identify the location of the last left pixel and last right pixel before the vertical shift is detected as the left coordinate and the right coordinate of Mouth Corner Candidate 4.

In addition, when applying Detection Scheme 5, the controller 320 and/or the coordinate application 310 identify a size of the face using one or more face detection methods. Based on the size of the face, the controller 320 and/or the coordinate application 310 can use a template face where locations of the mouth and other features are likely to be and identify a left coordinate and a right coordinate for Mouth Corner Candidate 5 based on the template face.

Figure 4:
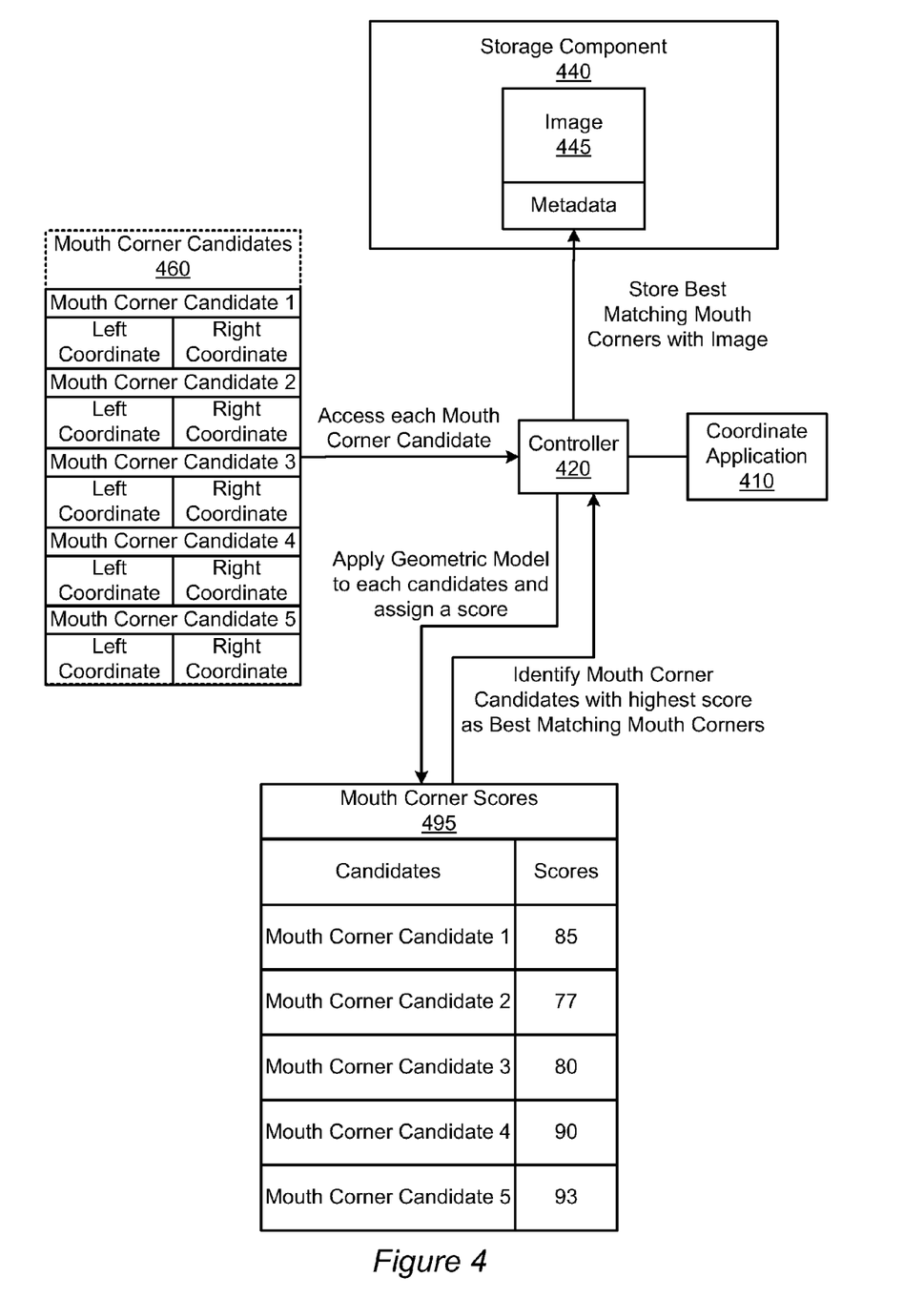
FIG. 4 illustrates a block diagram of a coordinate application identifying a best matching mouth corners according to an embodiment.

FIG. 4 illustrates a block diagram of a coordinate application 410 identifying a best matching mouth corners according to an embodiment. As noted above, the best matching mouth corners are a left mouth corner and a right mouth corner from the mouth corner candidates 460 identified by the controller 420 and/or the coordinate application 410 to be the most likely coordinates of the mouth corners of the face. The controller 420 can/or the coordinate application 410 can identify the best matching mouth corner in response to applying a geometric model to each of the mouth corner candidates 460.

In one embodiment, before applying a geometric model to the mouth corner candidates, the controller 420 and/or the coordinate application 410 can initially determine whether any of the mouth corner candidates 460 are located outside the boundaries of the face. The boundaries of the face can be detected by the controller 420 and/or the coordinate application 410 using one or more face detection methods. In another embodiment, a template of a face can be used to identify the boundaries of the face. If any of the mouth corner candidates 460 are detected to be outside of the boundaries, the controller 420 and/or the coordinate application 410 can filter them from the mouth corner candidates 460.

Once the mouth corner candidates 460 have been filtered, the controller 420 and/or the coordinate application 410 can apply a geometric model to the remaining mouth corner candidates 460. As noted above, the geometric model is a method or algorithm which uses the coordinates from the mouth corner candidates 460 to determine whether the listed coordinates or any coordinates around the listed coordinates correspond to corners of a shape, such as a mouth, within the image 445. In one embodiment, the geometric model includes active shape modeling.

When applying active shape modeling and/or any additional geometric model to the mouth corner candidates 460, the controller 420 and/or the coordinate application 410 can determine whether a shape of mouth would likely include mouth corners at or around the listed coordinates. In one embodiment, more than one mouth shape can be used. The active shape model and/or the geometric shape model can modify a shape or form of the mouth in different shapes or positions for the controller 420 and/or the coordinate application 410 to determine whether the coordinates at or around the mouth corner candidates 460 likely match the corners of the mouth when the shape or form of the mouth is modified. In one embodiment, the controller 420 and/or the coordinate application 410 can additionally assign a score 495 for each of the mouth corner candidates 460 based on the results from the geometric model. A score can be assigned based on the controller 420 and/or the coordinate application 410 determining from applying the geometric model, how likely the mouth corner candidates 460 are the true mouth corners of the face.

A mouth corner candidate 460 which is frequently identified by the geometric model to likely be mouth corners, as the shape of the mouth is modified, will receive a high score from the controller 420 and/or the coordinate application 410. Whereas, a mouth corner candidate 460 which is frequently identified by the geometric model to unlikely be the mouth corners, as the shape of the mouth is modified, will receive a low score from the controller 420 and/or the coordinate application 410. The higher the mouth corner candidate score, the more likely the coordinates from the mouth corner candidate are true mouth corners of the face.

As shown in FIG. 4, the controller 420 and/or the coordinate application 410 assign Mouth Corner Candidate 1 a score of 85, Mouth Corner Candidate 2 a score of 77, Mouth Corner Candidate 3 a score of 80, Mouth Corner Candidate 4 a score of 90, and Mouth Corner Candidate 5 a score of 93. The controller 420 and/or the coordinate application 410 determine that the mouth corner candidate with the highest score, mouth corner candidate 5, is most likely to be best matching mouth corner of the face.

Once the best matching mouth corners have been identified, they can be stored on the storage component 440 as metadata of the image 445 and/or as a file associated with the image 445. As noted above, more than one mouth shape can be used by a geometric model. If more than one mouth shape is used, the best matching mouth corners can be used by the controller 420, the coordinate application 410, and/or the geometric model to identify a best shape model for the mouth of the face. In other embodiments, the best matching mouth corners can be used as an anchor point for the mouth or the face and be rendered on a display component of the device.

Figure 5:
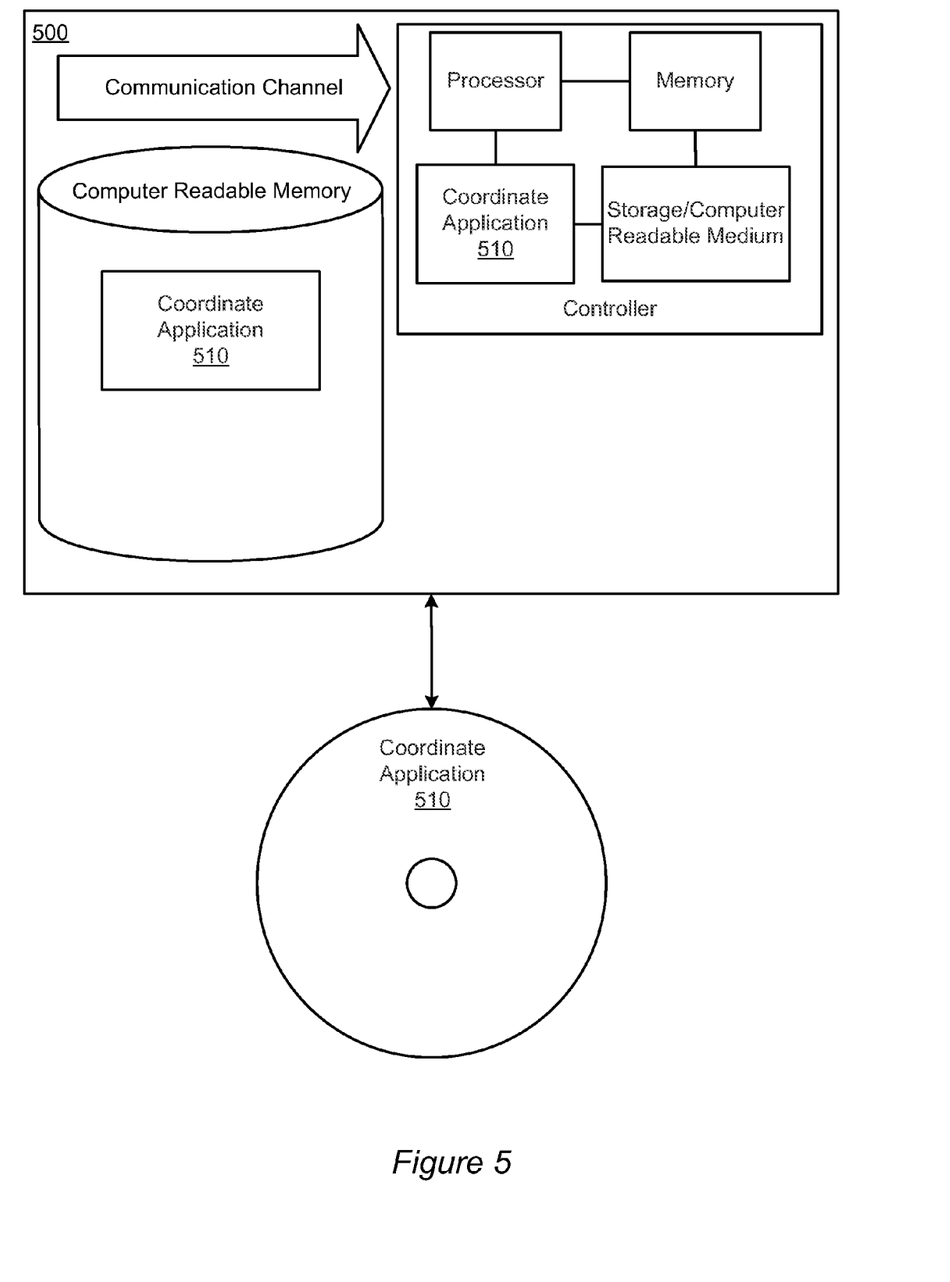
FIG. 5 illustrates a device with a coordinate application and a coordinate application stored on a removable medium being accessed by the device according to an embodiment.

FIG. 5 illustrates a device 500 with a coordinate application 510 and a coordinate application 510 stored on a removable medium being accessed by the device 500 according to an embodiment. For the purposes of this description, a removable medium is any tangible apparatus that contains, stores, communicates, or transports the application for use by or in connection with the device 500. As noted above, in one embodiment, the coordinate application 510 is firmware that is embedded into one or more components of the device 500 as ROM. In other embodiments, the coordinate application 510 is a software application which is stored and accessed from a hard drive, a compact disc, a flash disk, a network drive or any other form of computer readable medium that is coupled to the device 500. As shown in FIG. 5, the controller includes a processor, a memory, and a computer readable medium.

Figure 6:
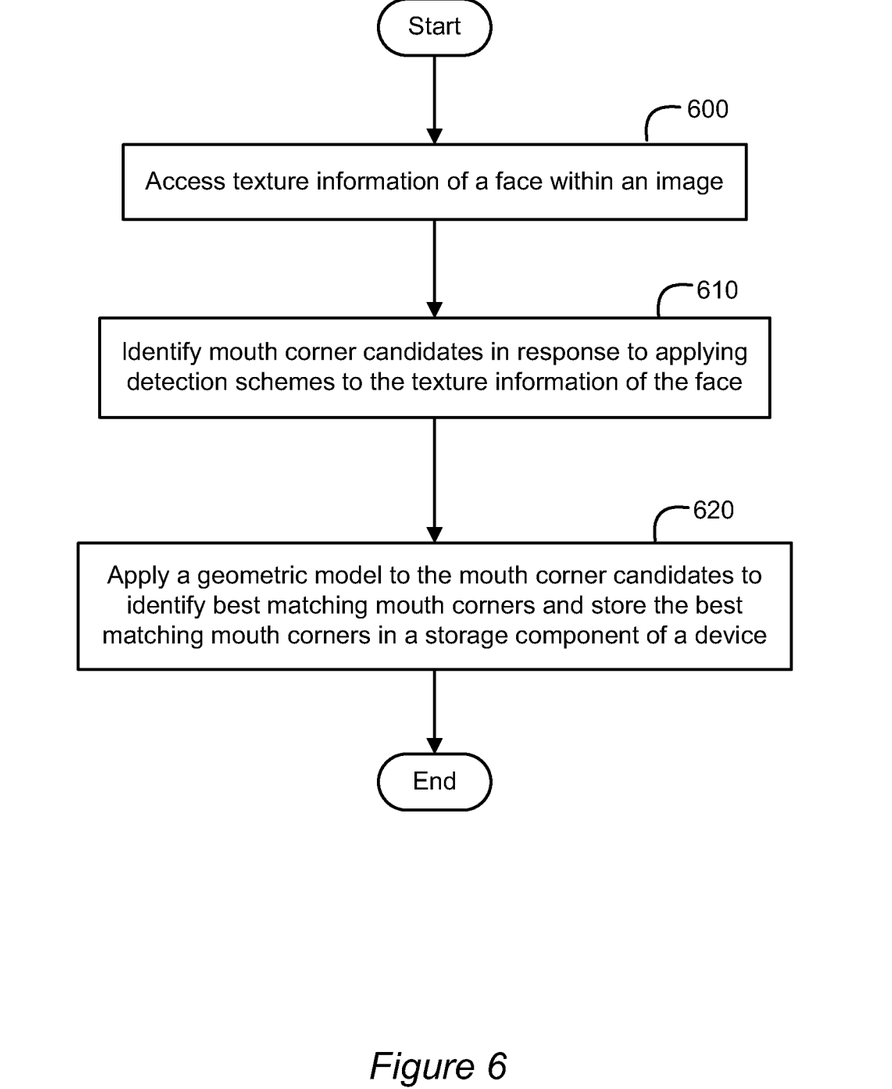
FIG. 6 is a flow chart illustrating a method for detecting mouth corners according to an embodiment.

FIG. 6 is a flow chart illustrating a method for detecting mouth corners according to an embodiment. The method of FIG. 6 uses a device with a controller, an image, and a coordinate application. In other embodiments, the method of FIG. 6 uses additional components and/or devices in addition to and/or in lieu of those noted above and illustrated in FIGS. 1, 2, 3, 4, and 5.

As noted above, the coordinate application can independently or in conjunction with the controller to detect mouth corners within an image. In one embodiment, the controller and/or the coordinate application can initially access an image and identify a location of a face within the image. If a face is detected, the controller and/or the coordinate application can proceed to access texture information of the face 600. As noted above, the texture information includes image data of the pixels which make up the face. The image data can list a color and/or coordinate of the pixels. The controller and/or the coordinate application can then apply one or more detection schemes to the texture information (pixels) to identify a mouth corner candidate for each detection scheme applied 610. When applying a detection scheme to the texture information of the face, the controller and/or the coordinate application can modify an image property of the face, detect for one or more pixels which match a predefined criteria, and/or detect a pattern of the pixels included in the face.

In response to identifying the mouth corner candidates, the controller and/or the coordinate application can filter any mouth corner candidates which fall outside the boundaries of the face. The controller and/or the coordinate application can then apply a geometric model to each remaining mouth corner candidate to identify the best matching mouth corners 620. As noted above, the geometric model can modify a shape of an object, such as a mouth, to one or more shapes to determine whether the listed coordinates and/or coordinates around the listed coordinates would like match the mouth corners of a face.

Once the best matching mouth corners have been identified, the controller and/or the coordinate application can store the best matching mouth corners to a storage component as metadata of the image and/or as a file associated with the image. The method is then complete. In other embodiments, the method of FIG. 6 includes additional steps in addition to and/or in lieu of those depicted in FIG. 6.

Figure 7:
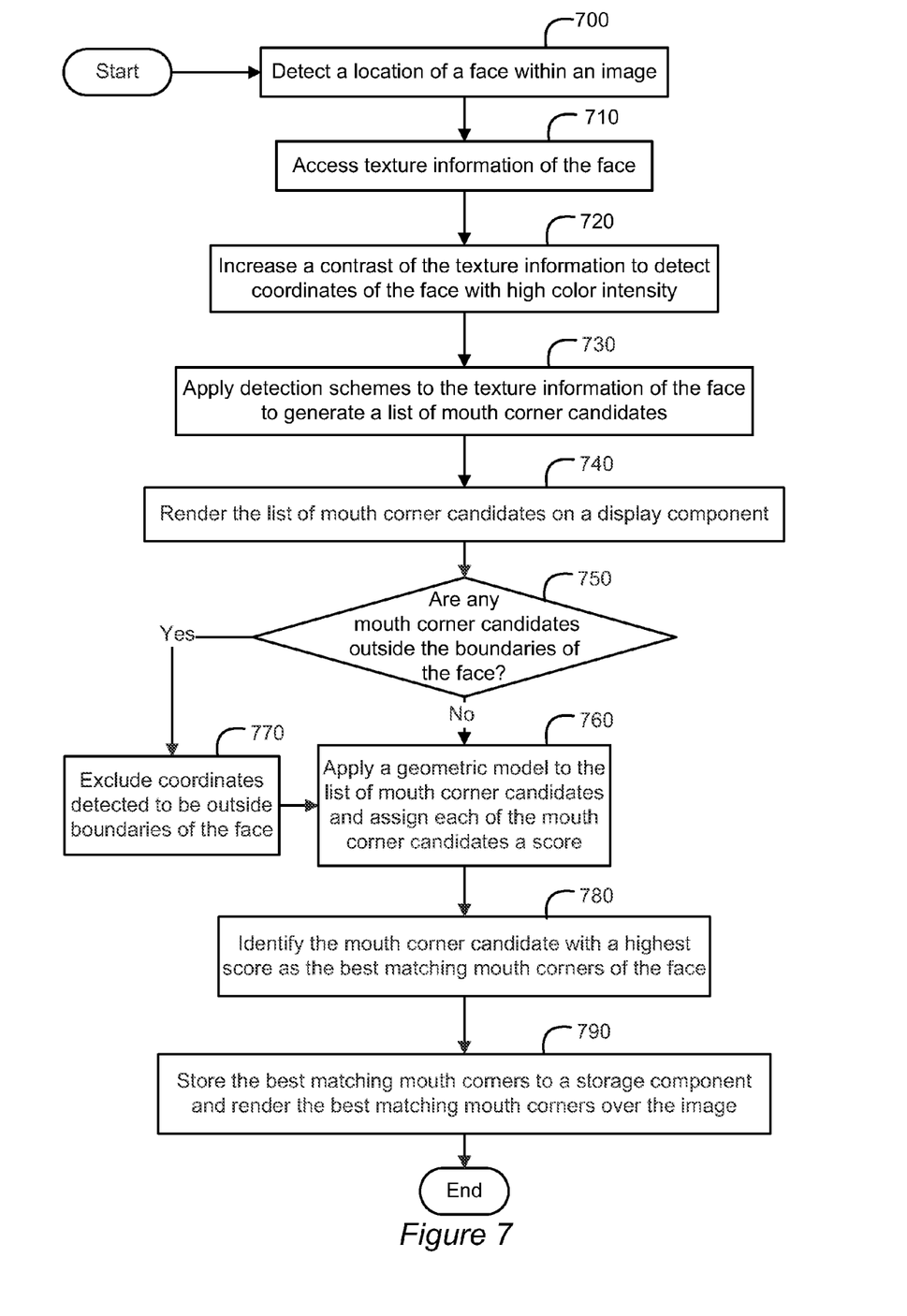
FIG. 7 is a flow chart illustrating a method for detecting mouth corners according to another embodiment.

FIG. 7 is a flow chart illustrating a method for detecting mouth corners according to another embodiment. Similar to the method of FIG. 6, the method of FIG. 7 uses a device with a controller, an image, and a coordinate application. In other embodiments, the method of FIG. 6 uses additional components and/or devices in addition to and/or in lieu of those noted above and illustrated in FIGS. 1, 2, 3, 4, and 5.

The controller and/or coordinate application initially detect a location of a face within an image using facial detection and/or eye detection technology 700. If the location of the face is detected, the controller and/or the coordinate application can access texture information of the face 710. As noted above, the controller and/or the coordinate application can initially increase a contrast of the pixels of the face to detect coordinates of pixels with a high color intensity 720. In another embodiment, the controller and/or the coordinate application can detect pixels with the color magenta to detect the locations of the mouth corners. A color intensity of pixels making up the mouth can be higher than the color intensity of other pixels on the face. Using the location of the high color intensity pixels, the controller and/or the coordinate can identify a location or area of the mouth on the face.

The controller and/or the coordinate application can then apply one or more detection schemes to the texture information to generate mouth corner candidates for each detection scheme applied by the controller and/or coordinate application 730. In one embodiment, a display component of the device can additionally render each mouth corner candidate over the image 740. The controller and/or the coordinate application can determine whether any of the mouth corner candidates fall outside the boundaries of the face 750. In another embodiment, the user can use the display component to determine whether any of the mouth corner candidates fall outside the boundaries of the face.

Any coordinates found outside the boundaries of the face can be filtered from the mouth corner candidates by the controller and/or the coordinate application 770. The controller and/or the coordinate application can then apply a geometric model to any remaining mouth corner candidates and assign each mouth corner candidate a score based on the geometric model 760. In one embodiment, the geometric model can additionally be applied to coordinates surrounding the mouth corner candidates. As noted above, the higher a score, the more likely the corresponding mouth corner coordinates are determined by the geometric model to be true mouth corners of the face.

The controller and/or the coordinate application identify the mouth corner candidate and/or coordinate around the mouth corner candidate with the highest score as the best matching mouth corners of the face 780. The controller and/or the coordinate application can additionally store the best matching mouth corners to a storage component as metadata of the image and/or as file associated with the image 790. In another embodiment, the best matching mouth corners can additionally be rendered on the image using the display component. The method is then complete. In other embodiments, the method of FIG. 7 includes additional steps in addition to and/or in lieu of those depicted in FIG. 7.

What is claimed is:

1. A method for detecting mouth corners within an image comprising:
    accessing texture information of a face within the image;
    identifying plural sets of mouth corner candidates in response to applying a plurality of different detection schemes to the texture information of the face, wherein the applying of each of the plurality of different detection schemes produces a corresponding different set of the plural sets of mouth corner candidates; and
    applying a geometric model to the mouth corner candidates to identify best matching mouth corners and storing the best matching mouth corners in a storage component of a device, wherein applying the geometric model comprises:
        determining which of the mouth corner candidates are most frequently identified by the geometric model as likely to match the mouth corners, for a plurality of different shapes of a mouth in the image,
        wherein the most frequently identified mouth corner candidates are identified as the best matching mouth corners.

2. The method for detecting mouth corners within an image of claim 1 wherein applying the plurality of different detection schemes comprises applying a first detection scheme that includes increasing a contrast of the texture information to detect coordinates of the face with high color intensity.

3. The method for detecting mouth corners within an image of claim 2 further comprising including two of the detected coordinates with the highest color intensity as mouth corner candidates.

4. The method for detecting mouth corners within an image of claim 2 wherein applying the plurality of different detection schemes comprises applying another detection scheme that applies a color transformation to the texture information of the face.

5. The method for detecting mouth corners within an image of claim 4 further comprising detecting coordinates of pixels of the face that are colored magenta and determining whether a shape of the detected coordinates of the pixels that are colored magenta match a shape of a mouth.

6. The method for detecting mouth corners within an image of claim 5 further comprising including a left corner coordinate and a right corner coordinate of the detected coordinates of the pixels that are colored magenta as mouth corner candidates.

7. The method for detecting mouth corners within an image of claim 2 wherein applying the plurality of different detection schemes comprises applying another detection scheme that includes detecting the texture information for a high contrast line horizontally across the face.

8. The method for detecting mouth corners within an image of claim 7 further comprising detecting a left end coordinate and a right end coordinate of the high contrast line and including the left end coordinate and the right end coordinate as mouth corner candidates.

9. The method for detecting mouth corners within an image of claim 8 wherein detecting the left end coordinate and the right end coordinate includes detecting contrast degradation on the high contrast line.

10. The method for detecting mouth corners within an image of claim 8 wherein detecting the left end coordinate and the right end coordinate includes detecting a shift of the high contrast line across a y-axis.

11. A device comprising:
    a storage medium to store an image; and
    a controller having a processor to:
        generate mouth corner candidates in response to applying detection schemes to texture information of a face detected within the image;
        identify best matching mouth corners by applying a geometric model to the mouth corner candidates and store the best matching mouth corners to the storage medium, wherein applying the geometric model comprises:
            determining which of the mouth corner candidates are most frequently identified by the geometric model as likely to match the mouth corners, for a plurality of different shapes of a mouth in the image,
            wherein the most frequently identified mouth corner candidates are identified as the best matching mouth corners.

12. The device of claim 11 further comprising a camera to capture the image.

13. The device of claim 11 further comprising a display to render the image and at least a subset of the mouth corner candidates on the image.

14. The device of claim 13 wherein the display is to render the best matching mouth corners on the image.

15. The device of claim 11 wherein applying the detection schemes comprises applying a plurality of different detection schemes to produce respective plural sets of the mouth corner candidates, and wherein the applying of each of the plurality of different detection schemes produces a corresponding different set of the plural sets of mouth corner candidates.

16. A non-transitory computer readable storage medium comprising instructions that if executed cause a controller to:
  access texture information of a face within an image;
  generate plural sets of mouth corner candidates by applying a plurality of different detection schemes to the texture information of the face, wherein the applying of each of the plurality of different detection schemes produces a corresponding different set of the plural sets of mouth corner candidates;
  apply a geometric model to the mouth corner candidates to identify best matching mouth corners of the face and store the best matching mouth corners in a storage component of a device, wherein applying the geometric model comprises:
    determining which of the mouth corner candidates are most frequently identified by the geometric model as likely to match the mouth corners, for a plurality of different shapes of a mouth in the image,
    wherein the most frequently identified mouth corner candidates are identified as the best matching mouth corners.

17. The computer readable storage medium comprising instructions of claim 16 wherein the best matching mouth corners are used by the geometric model to identify a best shape model for the mouth of the face.

18. The computer readable storage medium comprising instructions of claim 16 wherein the instructions cause the controller to filter the mouth corner candidates to exclude coordinates detected to be outside boudaries of the face.

19. The computer readable storage medium comprising instructions of claim 16 wherein the instructions cause the controller to assign scores to the mouth corner candidates in response to applying the geometric model on the mouth corner candidates.

* * * * *

UNITED STATES PATENT AND TRADEMARK OFFICE
CERTIFICATE OF CORRECTION

PATENT NO. : 8,891,876 B2
APPLICATION NO. : 13/093523
DATED : November 18, 2014
INVENTOR(S) : Daniel Bloom et al.

Page 1 of 1

It is certified that error appears in the above-identified patent and that said Letters Patent is hereby corrected as shown below:

In the Claims

In column 12, line 13, in Claim 18, delete "boudaries" and insert -- boundaries --, therefor.

Signed and Sealed this
Thirtieth Day of June, 2015

Michelle K. Lee
*Director of the United States Patent and Trademark Office*